(12) United States Patent
Kuo et al.

(10) Patent No.: US 8,646,706 B2
(45) Date of Patent: Feb. 11, 2014

(54) METHOD FOR PROTECTING ALUMINUM NITRIDE FROM MOISTURE

(75) Inventors: Yang-Kuao Kuo, Taoyuan County (TW); Chia-Yi Hsiang, Taoyuan County (TW); Fu-Hsing Huang, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 350 days.

(21) Appl. No.: 13/237,371

(22) Filed: Sep. 20, 2011

(65) Prior Publication Data
US 2013/0032649 A1    Feb. 7, 2013

(30) Foreign Application Priority Data

Aug. 4, 2011 (TW) .............................. 100127701 A

(51) Int. Cl.
*B02C 19/00* (2006.01)

(52) U.S. Cl.
USPC .............................................. 241/21; 241/25

(58) Field of Classification Search
USPC ....................................................... 241/21, 25
See application file for complete search history.

(56) References Cited

U.S. PATENT DOCUMENTS 5,682,594 A * 10/1997 Kennedy et al. ............... 428/549
2002/0058107 A1 * 5/2002 Fareed et al. ............. 427/255.39

* cited by examiner

*Primary Examiner* — Mark Rosenbaum
(74) *Attorney, Agent, or Firm* — Jackson IPG PLLC

(57) ABSTRACT

Disclosed is a method for protecting aluminum nitride from moisture. At first, a mixing apparatus is provided. Aluminum nitride powder, calcium silicate, dodecylamine, a binding agent and an anhydrous solvent are mixed with one another by the mixing apparatus. The mixture is made into grains in a granulating process. The hydrophilism, thermal stability and thermal conductivity of the dodecylamine are used to make the grains moisture-proof and not vulnerable to deterioration. Thus, the stability of the aluminum nitride is improved.

10 Claims, 3 Drawing Sheets

METHOD FOR PROTECTING ALUMINUM NITRIDE FROM MOISTURE

BACKGROUND OF INVENTION

1. Field of Invention

The present invention relates to a method for protecting aluminum nitride from moisture and, more particularly, to a method for protecting aluminum nitride from moisture via using calcium silicate and dodecylamine of which the hydrophilism, thermal stability and thermal conductivity make the aluminum nitride moisture-proof and not vulnerable to deterioration so that the stability of the aluminum nitride is improved.

2. Related Prior Art

Solid materials include metals, ceramics, polymers and composites. The ceramics include precision ceramics. The precision ceramics exhibit mechanical strength, stability at high temperature, wear-resistance and erosion-resistance. Some of the precision ceramics even exhibit conductivity at high temperature, isolation, piezoelectricity and photoconductivity. Hence, the precision ceramics are deemed essential in science and technology.

Aluminum nitride is an important precision ceramic material. Aluminum nitride is highly thermally conductive as its heat transfer coefficient reaches 170 W/mK. Moreover, aluminum nitride is electrically isolative, mechanically strong, refractory and vibration-resistant. Hence, aluminum nitride can be used to make a substrate for use in a high-power electronic device.

A conventional process for making an aluminum nitride substrate includes the steps of providing aluminum nitride powder, molding, sintering and finishing. Each of the steps of the process influences the quality of the aluminum nitride substrate. Hence, the process for making the aluminum nitride substrate must be chosen carefully.

An aluminum nitride substrate radiates heat more than 7 times better than a substrate made of sapphire. The life of an aluminum nitride substrate reaches 6000 to 7000 hours. However, aluminum nitride easily reacts with oxygen. Therefore, in a hot or wet environment, the aluminum nitride on the surface of an aluminum nitride substrate easily reacts with oxygen and water to produce aluminum oxide. Thus, the purity of the aluminum nitride substrate is reduced, and the performance regarding the heat radiation is reduced.

The present invention is therefore intended to obviate or at least alleviate the problems encountered in prior art.

SUMMARY OF INVENTION

It is the primary objective of the present invention to provide a method for protecting aluminum nitride from moisture.

To achieve the foregoing objective, the method includes the step of providing a mixing apparatus for mixing aluminum nitride powder, calcium silicate, dodecylamine, a bonding agent and an anhydrous solvent with one another to provide a mixture. Then, a granulating process is executed to make the mixture into a plurality of aluminum nitride grains.

In another aspect, the mixing apparatus includes a container and an agitator provided in the container.

In another aspect, the bonding agent is PVB.

In another aspect, the anhydrous solvent is absolute alcohol.

In another aspect, the anhydrous solvent is methanol.

In another aspect, the anhydrous solvent is alcohol.

In another aspect, the anhydrous solvent is benzene.

In another aspect, the granulating process is a pelletizing process.

In another aspect, the granulating process is a grinding and screening process.

In another aspect, each of the aluminum nitride grains is covered by a plurality of calcium silicate grains and a plurality of dodecylamine grains. The calcium silicate grains are used to absorb moisture from the aluminum nitride grain. The dodecylamine grains are used to prevent moisture from reaching the aluminum nitride grain.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
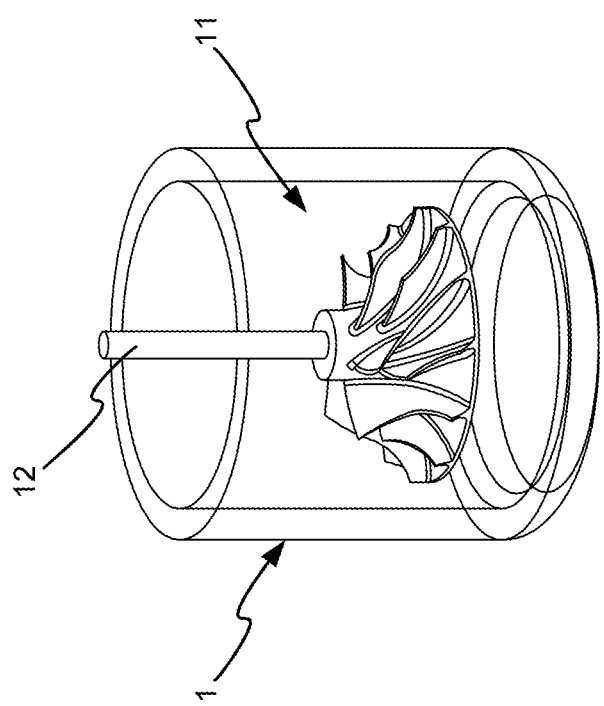
FIG. 1 is a perspective view of a mixing apparatus used in a method for protecting aluminum nitride from moisture according to the preferred embodiment of the present invention.
Figure 2:
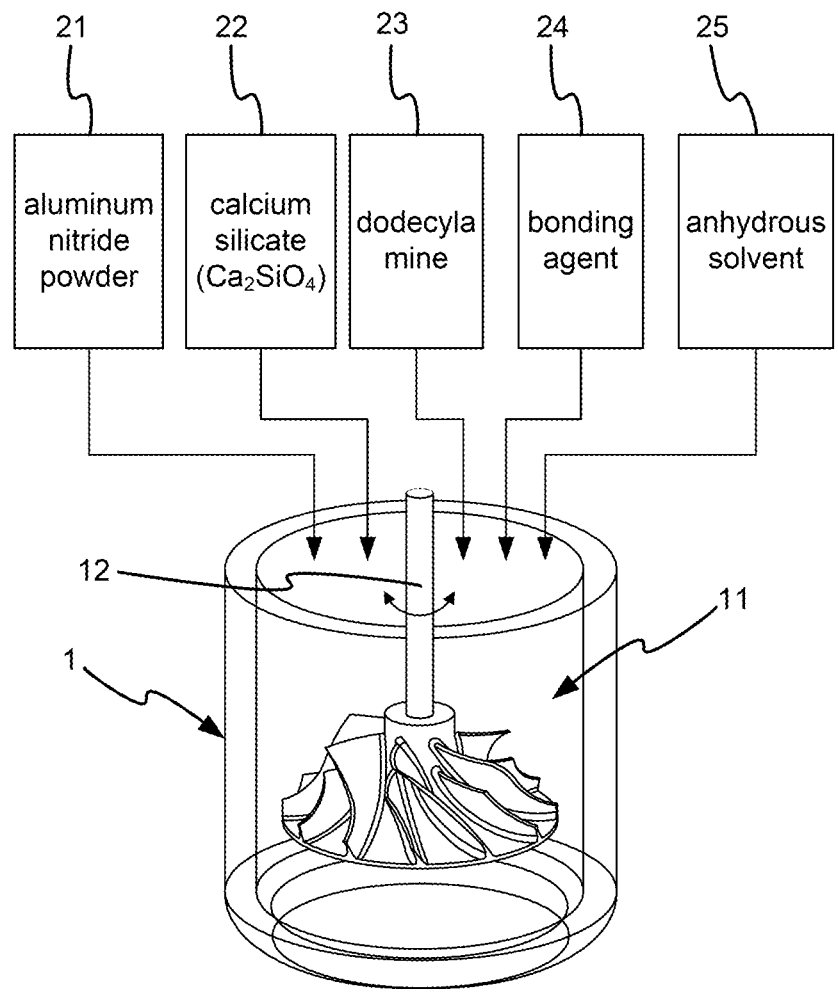
FIG. 2 is a perspective view of the mixing apparatus at another step of the method than shown in FIG. 1.
Figure 3:
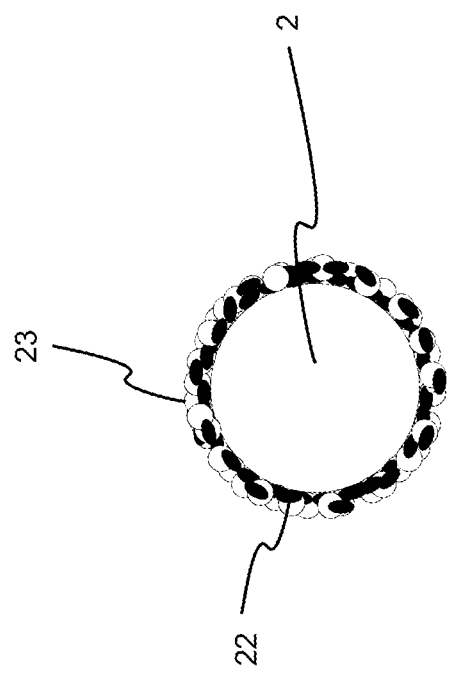
FIG. 3 is an enlarged cross-sectional view of an aluminum nitride grain processed by the method shown in FIGS. 1 and 2.

Referring to FIGS. 1 through 3, there is shown a method for protecting aluminum nitride from moisture according to the preferred embodiment of the present invention.

Referring to FIG. 1, there is provided a mixing apparatus 1. The mixing apparatus 1 includes a container 11 and an agitator 12 provided in the container 11.

Referring to FIG. 2, aluminum nitride powder 21, calcium silicate ($Ca_2SiO_4$) 22, dodecylamine 23, a bonding agent 24 and an anhydrous solvent 25 are provided in the container 11 of the mixing apparatus 1 and mixed with one another by the agitator 12 to provide a mixture. The bonding agent 24 may be PVB for example. The anhydrous solvent 25 may be absolute alcohol, methanol, alcohol or benzene for example.

Referring to FIG. 3, the mixture is made into aluminum nitride grains 2 in a granulating process. The granulating process may be a pelletizing process or a grinding and screening process. As shown, each of the aluminum nitride grains 2 is covered by a plurality of calcium silicate ($Ca_2SiO_4$) grains 22 and a plurality of dodecylamine grains 23. The calcium silicate grains 22 are used to absorb moisture from the aluminum nitride grain 2 while the dodecylamine grains 23 are used to prevent moisture from reaching aluminum nitride grain 2.

As described above, in the method for protecting aluminum nitride from moisture, the calcium silicate and dodecylamine, which absorb moisture and are stable and conductive at high temperature, are used to cover and protect the aluminum nitride from moisture. Therefore, the aluminum nitride is not vulnerable to deterioration. Furthermore, the stability of the aluminum nitride in the air is ensured.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for protecting aluminum nitride from moisture including the steps of:
   providing a mixing apparatus;
   providing aluminum nitride powder, calcium silicate, dodecylamine, a bonding agent and an anhydrous solvent in the mixing apparatus and mixing them with one another to provide a mixture; and
   making the mixture into a plurality of aluminum nitride grains in a granulating process.

2. The method for protecting aluminum nitride from moisture according to claim 1,
   wherein the mixing apparatus includes a container and an agitator provided in the container.

3. The method for protecting aluminum nitride from moisture according to claim 1,
   wherein the bonding agent is PVB.

4. The method for protecting aluminum nitride from moisture according to claim 1,
   wherein the anhydrous solvent is absolute alcohol.

5. The method for protecting aluminum nitride from moisture according to claim 1,
   wherein the anhydrous solvent is methanol.

6. The method for protecting aluminum nitride from moisture according to claim 1,
   wherein the anhydrous solvent is alcohol.

7. The method for protecting aluminum nitride from moisture according to claim 1,
   wherein the anhydrous solvent is benzene.

8. The method for protecting aluminum nitride from moisture according to claim 1,
   wherein the granulating process is a pelletizing process.

9. The method for protec throughout ting aluminum nitride from moisture according to claim 1,
   wherein the granulating process is a grinding and screening process.

10. The method for protecting aluminum nitride from moisture according to claim 1,
    further comprising covering each of the aluminum nitride grains with both a plurality of calcium silicate grains for absorbing moisture from the aluminum nitride grain and a plurality of dodecylamine grains for preventing moisture from reaching the aluminum nitride grain.

* * * * *